US006876872B2

United States Patent
Ko

(12) United States Patent
(10) Patent No.: US 6,876,872 B2
(45) Date of Patent: Apr. 5, 2005

(54) POWER CONTROL APPARATUS OF A FOLDABLE PORTABLE MOBILE TERMINAL

(75) Inventor: Moon Jung Ko, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 448 days.

(21) Appl. No.: 09/841,990

(22) Filed: Apr. 25, 2001

(65) Prior Publication Data

US 2002/0052228 A1 May 2, 2002

(30) Foreign Application Priority Data

Oct. 31, 2000 (KR) ........................................ 2000-64192

(51) Int. Cl.[7] ................................................ H04B 1/38
(52) U.S. Cl. .................... 455/572; 455/343.1; 455/90.3; 455/550.1; 455/347; 379/433.06; 379/433.01
(58) Field of Search ........................... 455/343.3, 343.2, 455/343.4, 343.1, 574, 550.1, 556.1, 556.2, 572, 575.1, 575.4, 127.1, 127.5, 128, 348, 90.3; 379/433.06

(56) References Cited

U.S. PATENT DOCUMENTS 6,094,565 A * 7/2000 Alberth et al. ........... 455/575.3
6,094,586 A * 7/2000 Nishiyama et al. ......... 455/566
6,628,974 B1 * 9/2003 Lim ....................... 379/433.11

* cited by examiner

*Primary Examiner*—Marsha D. Banks-Harold
*Assistant Examiner*—Willie J. Daniel, Jr.
(74) *Attorney, Agent, or Firm*—Dilworth & Barrese LLP

(57) ABSTRACT

A power control apparatus in a foldable portable radio terminal which includes a main body, a sub-body, a key-pad including a power key on the main body, an external function key which can be key-input by a user even if the sub-body is shut on the main body is disclosed. The power control apparatus includes a first switch, a second switch, and a control unit for controlling the first and second switch according to powered-on/off state of the terminal. One end of each of the first and second switch is connected in common at a first node connected to the external function key and the other end of the first switch is connected to a first input end of the control unit, and the other end of the second switch and the power key are connected in common via a second node connected to a second input end of the control unit. According to the invention, the external function key (the automatic folder switch for example) as the power key is realized so that the user can power-on the terminal without opening the sub-body even in the powered-off state of the terminal, and the terminal keys can perform their own functions in the powered-off state of the terminal.

4 Claims, 5 Drawing Sheets

POWER CONTROL APPARATUS OF A FOLDABLE PORTABLE MOBILE TERMINAL

PRIORITY

This application claims priority to an application entitled "POWER CONTROL APPARATUS OF FOLDED PORTABLE MOBILE TERMINAL" filed with the Korean Industrial Property Office on Oct. 31, 2000 and assigned Serial No. 2000-64192, the contents of which are hereby incorporated by reference.

BACKGROUND OF THE INVENTION

1. Field of the Invention

The present invention relates generally to a portable mobile terminal, and more particularly, to a power control apparatus of a foldable portable mobile terminal.

2. Description of the Related Art

In general, portable mobile terminals are classified into bar type terminals and foldable terminals. While the bar type terminal is gradually decreasing in use since the key-pad of the terminal is exposed from the body of the terminal, the foldable terminal is currently being developed in various shapes due to the sub-body of the terminal opening/closing in respect to the main body of the terminal to protect the key-pad of the terminal.

The foldable terminals are usually classified into flip type terminals, flip-up type terminals and folder type terminals. The flip type terminal has a flip cover for protecting the key-pad on the main body and collecting a transmitting sound. The flip cover functions as a sub-body. The flip-up type terminal has a flip cover that opens toward the upper side of the main body. The folder type terminal has an LCD (Liquid Crystal Display) module on a the sub-body thereof.

The foldable terminal has a key for powering on/off the terminal (hereinafter will be referred to as "power key") in the key-pad on the main body. The key can be covered by the sub-body. Therefore, in order to power on/off the foldable terminal, a user should open the sub-body closed onto the main body. Then, the user can power on/off the terminal by using the power key.

As described above, the sub-body must be opened for the powering-on/off of the foldable terminal. Therefore, it may be convenient for the user if the terminal can be powered on/off with the sub-body remaining closed.

SUMMARY OF THE INVENTION

It is, therefore, an object of the present invention to provide a power control apparatus in a foldable portable radio terminal allowing the terminal to be powered on/off with the sub-body of the terminal being closed.

It is another object of the present invention to provide a power control apparatus in a foldable portable radio terminal comprising an external function key which can be used as a power key.

Yet another object of the present invention is to provide a power control apparatus in a foldable portable radio terminal comprising an automatic folder key which can also be used as a power key.

To achieve the above objects of the invention, a power control apparatus in a foldable portable radio terminal comprising a main body, a sub-body, a key-pad including a power key on the main body, and an external function key which can be key-input by a user even if the sub-body is closed onto the main body. The power control apparatus comprises a first switch, a second switch, and a control unit for controlling the first and second switches according to powered-on/off state of the terminal. One end of each of the first and second switch is connected in common via a first node connected to the external function key. The other end of the first switch is connected to first input end of the control unit, and the other end of the second switch and the power key are connected in common via a second node connected to a second input end of the control unit.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

Figure 1A:
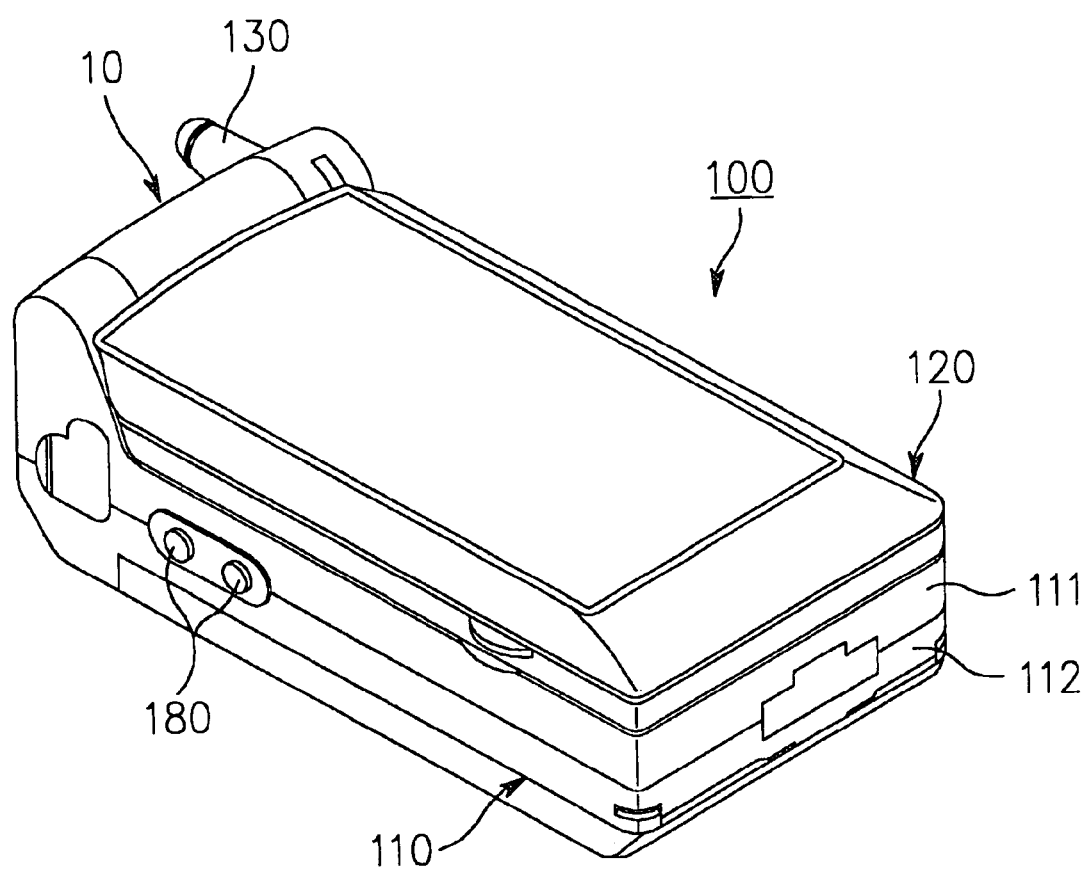
FIG. 1A is a perspective view of a portable radio terminal having a sub-body closed onto a main body according to an embodiment of the present invention.

Hereinafter preferred embodiments of the present invention will be described in detail with reference to the accompanying drawings. It should be understood that like elements in the drawings are referred to by like numerals over the entire application. Also, in the following description, well-known functions or constructions are not described in detail since they would obscure the invention in unnecessary detail.

The present invention is applicable to a portable terminal in which a sub-body can be opened from or closed onto a main body in an automatic and manual opening/closing manner according to the convenience of a user. Also, the invention can be applied to a portable terminal in which a sub-body can be used for only either an automatic or a manual opening/closing. While the embodiments of the invention are described about a opening/closing mechanism applied to a folder type portable terminal, it is apparent to those skilled in the art that the opening/closing mechanism of the invention can easily be applied to another type of foldable portable terminal.

Figure 1B:
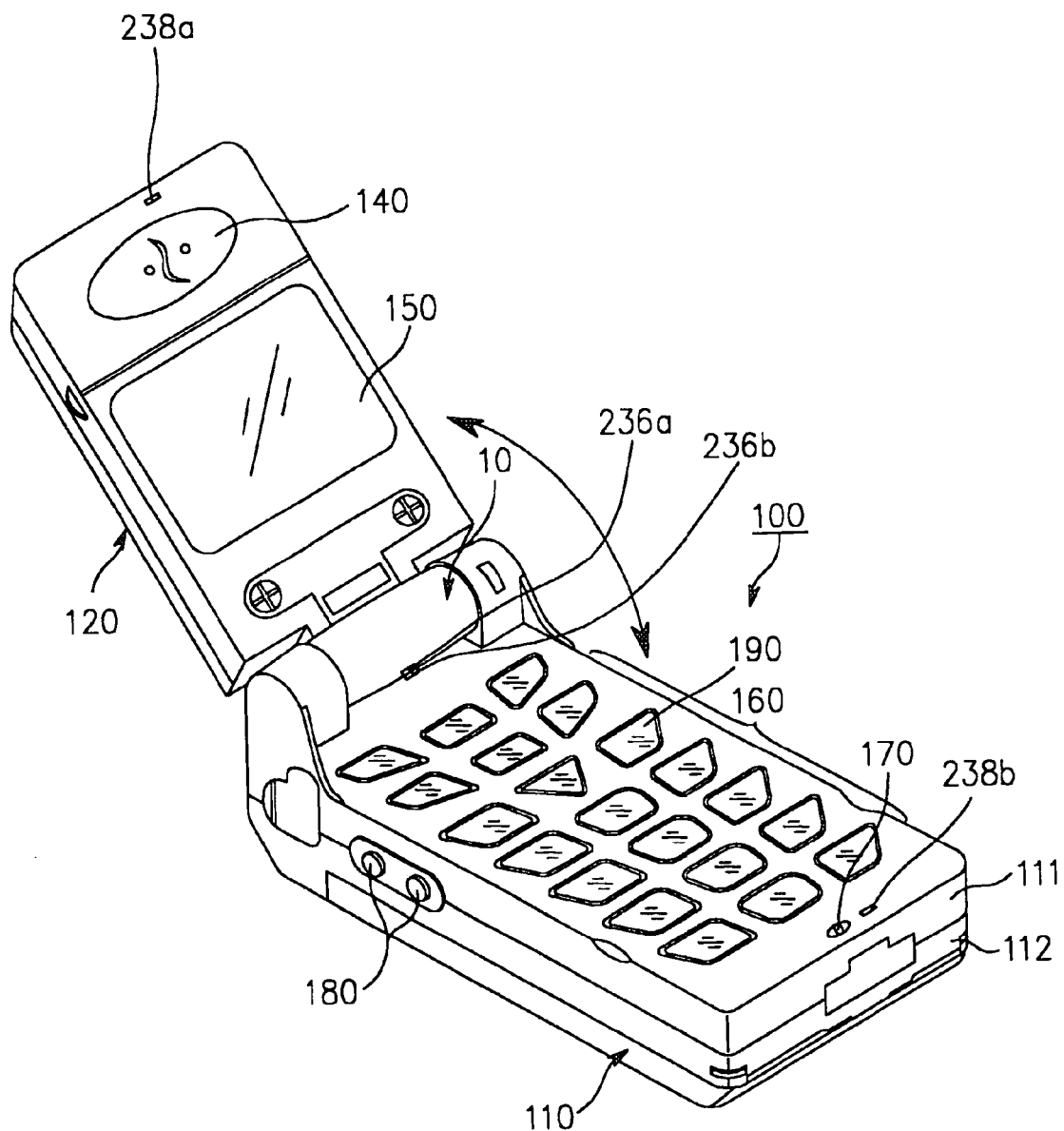
FIG. 1B is a perspective view of the portable radio terminal having the sub-body opened from the main body according to an embodiment of the present invention.

FIG. 1A is a perspective view of a foldable portable radio terminal 100 according to an embodiment of the invention in which a sub-body 120 is closed onto a main body 110. FIG. 1B is a perspective view of the portable radio terminal 100 in which the sub-body 120 is opened from the main body 110.

Referring to FIGS. 1A and 1B, the portable radio terminal 100 is comprises the main body 110 having an upper casing frame 111 and a lower casing frame 112, and the sub-body 120 for protecting a key-pad and so on. On one side of the main body 110, a opening/closing mechanism 10 is provided to open/close the sub-body automatically or manually according to opening/closing control of the user. An antenna unit 130 is provided on one side of the upper most end of the main body 110. An ear piece 140 is provided on a portion of the sub-body 120 connected to the main body 110, and an LCD module 150 as a display unit is placed under the ear piece 140. A key-pad 160 and a microphone unit 170 are placed on the main body 110. The key-pad 160 includes a power key 190 as shown in FIG. 1B. An automatic folder switch 180 is provided on one side of the main body 110 to automatically open/close the sub-body from/onto the main body 110. When the user uses the automatic folder switch 180 for automatic opening/closing or performs a manual opening/closing, the sub-body 120 is opened/closed from/onto the main body by the opening/closing mechanism.

Figure 2:
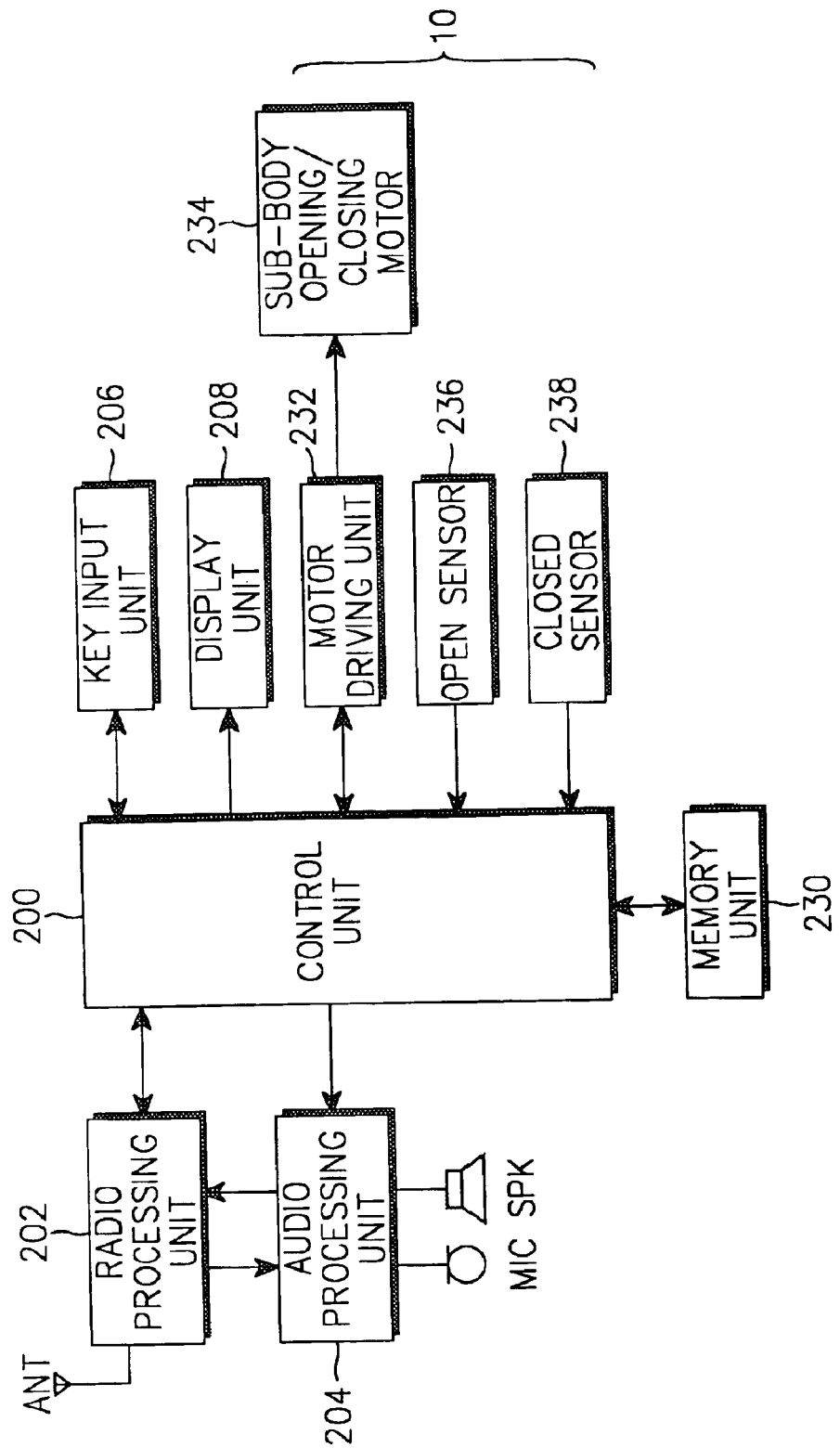
FIG. 2 is a block diagram of the portable radio terminal according to an embodiment of the present invention.

FIG. 2 is a block diagram of the portable radio terminal 100 according to an embodiment of the invention. Referring to FIG. 2, the control unit 200 performs the overall control of the portable radio terminal 100. A radio processing unit 202 controls transmission/reception of audio and control data under the control of the control unit 200. An audio processing unit 204 converts audio data received from the radio processing unit 202 into audible sound which is outputted via a speaker SPK, and processes an audio signal received via a microphone MIC into data which is output to the radio processing unit 202 under the control of the control unit 200. A key input unit 206 includes a plurality of number keys and function keys in the key-pad, the automatic folder switch 180 on one side of the main body 110 as shown in FIGS. 1A and 1B, and outputs data corresponding to keys pressed by the user to the control unit 200. The display unit 208 corresponds to LCD 150 and displays a number of messages and images under the control of the control unit 200. The memory unit 230 includes a program memory for storing program data necessary for controlling the operation of the portable mobile terminal, and a data memory for storing data generated during control or performance by the user.

A circuit block in FIG. 2 includes a motor driving unit 232, a sub-body opening/closing motor 234, a sub-body open sensor 236 and a sub-body closed sensor 238. The motor driving unit 232 operates so that the sub-body opening/closing motor 234 is rotated clockwise or counter clockwise under the control of the control unit 200. The open sensor 236 detects that the sub-body 120 is completely opened from the main body 110, and the closed sensor 238 detects that the sub-body 120 is completely closed on the main body 110. The open sensor 236 and the closed sensor 238 can be realized, for example, as hall sensors having hall elements and magnets. If the open sensor 236 and the closed sensor 238 are realized as the hall sensors, positions of the hall elements and the magnets in the open sensor 236 and the shut sensor 238 will be described in reference to FIG. 1B as follows.

In the open sensor 236 including a magnet 236a and a hall element 236b, the magnet 236a is arranged on a hinge of the opening/closing mechanism 10 and the hall element 236b is arranged on the upper most side of the main body 110 as shown in FIG. 1B. When the sub-body 120 is completely opened by the opening/closing mechanism 10, the hall element 236b and the magnet 236a of the open sensor 236 are in contact with each other and thus the open sensor 236 outputs a detection signal of sub-body opening complete to the control unit 200. In the closed sensor 238 including the magnet 238a and the hall sensor 238b, the magnet 238a is arranged above the ear piece 140 in the sub-body and the hall element 238b is arranged on the lower most side of the main body 110 as shown in FIG. 1B. When the sub-body 120 is completely closed by the opening/closing mechanism 10, the hall element 238b and the magnet 238a of the closed sensor 238 contact each other, and thus the closed sensor 238 outputs a detection signal of sub-body closing complete to the control unit 200. When the user of the portable mobile terminal 100 uses the automatic folder switch 180 to perform a sub-body automatic opening/closing control, the control unit 200 controls the operation of the motor driving unit 232 of the opening/closing mechanism 10 to automatically open/close the sub-body 120 upon recognizing the opening/closing control. The sub-body opening/closing motor 234 rotates clockwise or counter clockwise according to the operation control of the motor driving unit 232 so that the sub-body 120 can be opened or closed.

According to an embodiment of the invention, a power control apparatus in which the user can power on/off the terminal by using either the automatic folder switch 180 arranged in the side of the main body 110 or the power key 190 in the key pad on the main body 110 is provided. Therefore, the user can power on/off the terminal without opening the sub-body 120. Also, when the terminal is powered on, the automatic folder switch 180 or the power key 190 can perform their own characteristic key functions.

Figure 3:
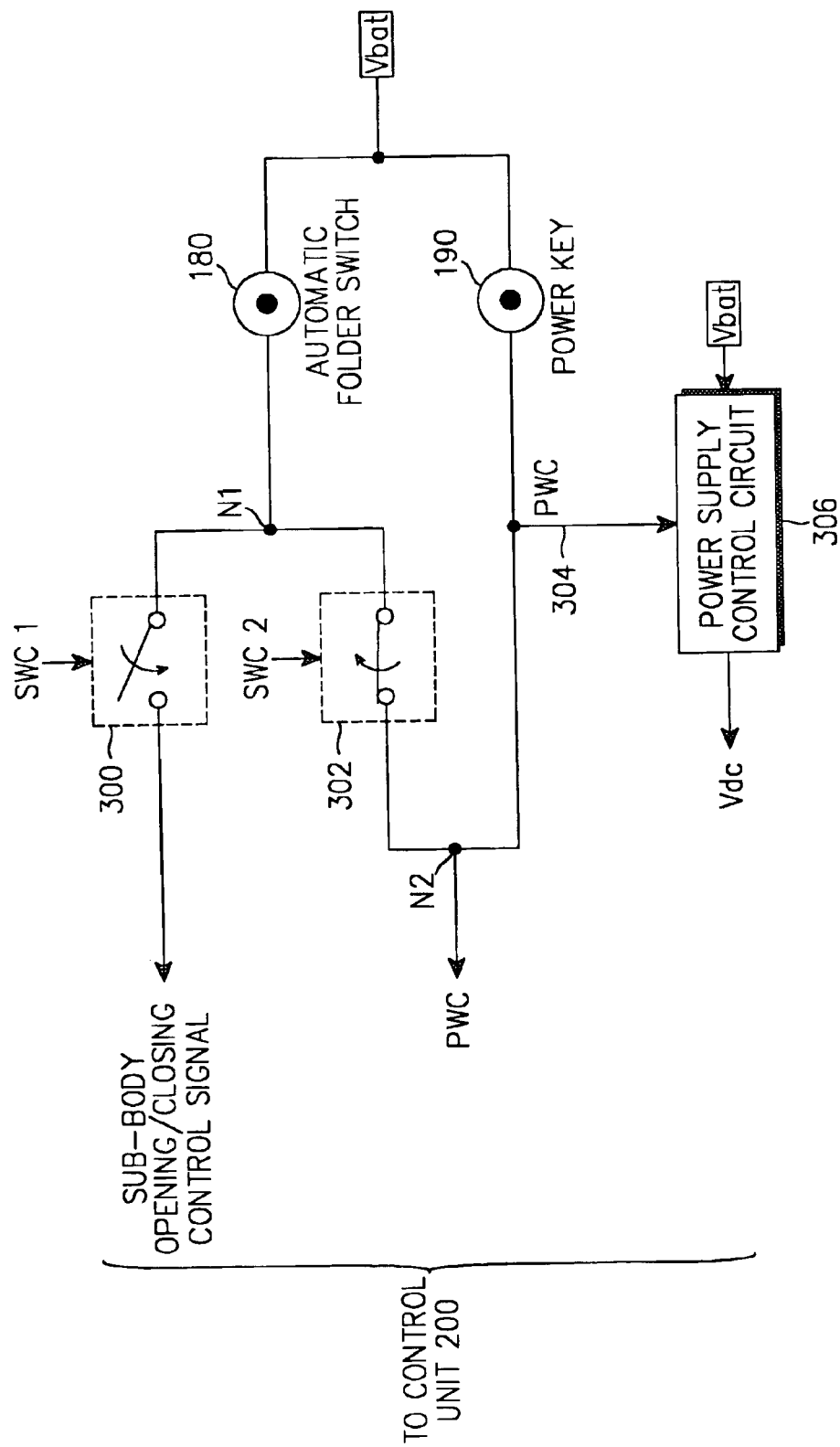
FIG. 3 is a schematic circuit diagram of the portable radio terminal which can be folded both in an automatic and a manual manner according to an embodiment of the invention.
Figure 4:
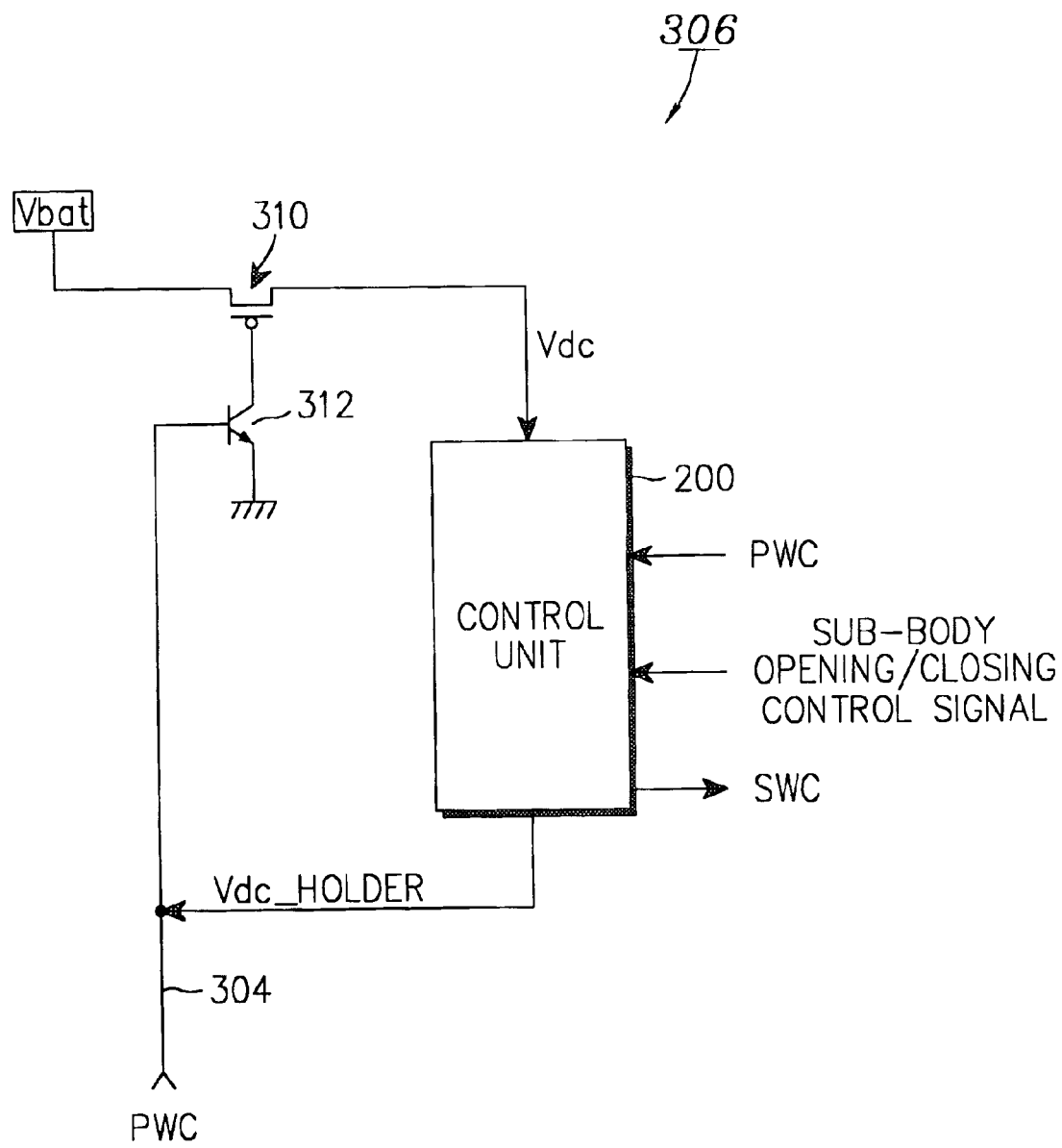
FIG. 4 is a circuit diagram of a power supply control circuit shown in FIG. 3.

FIG. 3 is a circuit diagram of the power control apparatus in the portable radio terminal which can be folded in an automatic and manual manner according to an embodiment of the invention. FIG. 4 illustrates a detailed circuit structure of the control unit 200 and a power supply control circuit 306 as illustrated in FIG. 3.

The automatic folder switch 180 in FIG. 3 is the automatic folder switch 180 arranged in the side of the main body 110 as shown in FIG. 1A and 1B. The power key 190 in FIG. 3 is the power key 190 on the key-pad 160 on the main body as shown in FIG. 1B.

The power control apparatus according to an embodiment of the present invention includes the automatic power switch 180, the power key 190, a first switch SWC1 300, a second switch SWC2 302 and the power supply control circuit 306 as shown in FIG. 3. The power control apparatus also includes the control unit 200 shown in FIG. 2. The first and second switches 300 and 302 in FIG. 3 are switched under the control of the control unit 200 in FIG. 2. The control unit 200 controls the switching of the first and second switches 300 and 302 according to power on/off states of the terminal 100.

The automatic folder switch 180 and the power key 190 are connected to a battery power $V_{bat}$. The automatic folder switch 180 is connected in common to the first and second switches 300 and 302 at one of the ends thereof at a node N1. The other end of the first switch 300 is connected to a first input end of the control unit 200. The first input end of the control unit 200 is applied a sub-body opening/closing control signal. The power key 190 is connected in common to a second input end of the control unit 200 and the other end of the second switch 302 at node N2. The second input end of the control unit 200 is applied with a power control signal PWC.

The power supply control circuit 306 in FIG. 3 is a circuit for controlling the supply and interruption of the battery power $V_{bat}$ to the control unit 200 and each circuit portion according to switching on/off the power key 190 by the user. The power supply control circuit 306 in FIG. 3 includes a P channel field effect transistor 310 and an NPN transistor 312.

Hereinafter, the operation according to an embodiment of the invention will be described in detail with reference to FIG. 1A to FIG. 4.

In an embodiment of the present invention, the control unit 200 controls the first switch 300 open and the second switch 302 closed in the powered-off state of the terminal 100. Accordingly, the user can power on the terminal 100 by using either the automatic folder switch 180 or the power key 190 in the powered-off state. Also, the control unit 200 controls the first switch 300 closed and the second switch 302 open in the powered-on state of the terminal 100. Accordingly, the automatic folder switch and the power key 190 can perform their own functions.

First, the operation according to an embodiment of the invention in the powered-off state of the terminal 100 will be described. When the user powers off the terminal 100, the control unit 200 controls the first switch 300 open and the second switch closed by using a switch control signal SWC. Therefore, the first switch 300 is closed and the second switch 302 is open in the powered-on state of the terminal. In this powered-off state of the terminal, when the user opens the sub-body 120 to press the power key 190 or presses the automatic folder switch 180 in the side of the main body 110 without opening the sub-body 120, the power control signal PWC in a logic "high" state is applied to the power supply control circuit 306 via a line 304 and also to the control unit 200 via the node N2 as shown in FIG. 3. In other words, pressing the automatic folder switch 180 applies the power control signal PWC in the logic "high" state to the control unit 200 via the second switch 302 in the closed state and the node N2, and pressing the power key 190 applies the power control signal PWC in the logic "high" state to the control unit 200 via the node N2.

When the power control signal PWC in the logic "high" state is applied to the power supply control circuit 306, the NPN transistor 312 of the power supply control circuit 306 is turned on and thus the P channel field effect transistor 310 is turned on also. As the field effect transistor 310 is turned on, the battery power $V_{bat}$ is supplied to the control unit 200 as a DC power $V_{dc}$. As the DC power $V_{dc}$ is supplied, the control unit 200 is activated. In the activated state, as the user presses the power key 190 or the automatic folder switch 180, the control unit 200 detects the power control signal PWC in the logic "high" state which is applied via the node N2 in FIG. 3, and determines if the power control signal PWC is continuously applied for a certain time, for example, 3 to 4 seconds. If the power control signal PWC is continuously applied for a certain time, the control unit 200 applies a $V_{dc\text{-}holder}$ signal in logic "high" state to a base of the NPN transistor 312 so that the P channel field effect transistor 310 may be continuously turned on. Accordingly, the power $V_{bat}$ is continuously supplied to the control unit 200 as the DC power $V_{dc}$ even if the user stops pressing the power key. The control unit 200 will control each of circuits to be supplied with the battery power $V_{bat}$.

Next, the operation according to an embodiment of the invention in the powered-on state of the terminal 100 will be described. In the powered-on state of the terminal 100, the control unit 200 controls the first switch 300 closed and the second switch 302 open by using the switch control signal SWC. Accordingly, if the user presses the automatic folder switch 180 in the powered-on state of the terminal 100, a sub-body opening/closing signal is applied to the control unit 200 via the node N1 and the first switch 300. Also, if the user presses the power key 190 in the powered-on state of the terminal, the power control signal PWC is applied to the control unit 200 via the node N2. In other words, the automatic folder switch 180 and the power key 190 perform their own functions in the powered-on state of the terminal 100.

According to the present invention as described above, the external function key (the automatic folder switch 180 for example) as the power key is realized so that the user can power on without opening the sub-body even in the powered-off state of the terminal. Also, there is an advantage that the terminal keys can perform their own functions in the powered-off state of the terminal.

While the embodiment of the present invention has been described while using the automatic folder switch 180 arranged at the outside of the terminal 100 as an example, it will be apparent to those skilled in the art that the spirit can be applied to other function keys performing other functions. Also, while the embodiment of the invention is applied to the foldable portable radio terminal, it can be applied even to a bar type terminal. A number of variations can be made without departing from the scope of the invention. Therefore, the scope of the invention is not defined by the foregoing embodiment of the invention, but should be defined by claims and equivalents thereof.

What is claimed is:

1. A power control apparatus in a foldable portable radio terminal which includes a main body, a sub-body, a key-pad including a power key on the main body, an external function key which can be key-inputted by a user even if the sub-body is closed onto the main body, said power control apparatus comprising:

a first switch;

a second switch; and a control unit for controlling said first and second switches according to a powered-on/off state of the terminal;

wherein one end of each of said first switch and said second switch is connected in common at a first node connected to the external function key and the other end of said first switch is connected to a first input end of said control unit, and the other end of said second switch and the power key are connected in common via a second node connected to a second input end of said control unit.

2. A power control apparatus in a foldable portable radio terminal according to claim 1, wherein said control unit controls said first switch open and said second switch closed in the powered-off state of the terminal; and controls said first switch closed and said second switch open in the powered-on state of the terminal.

3. A power control apparatus in a portable radio terminal which can be folded in an automatic and manual manner and includes a main body, a sub-body, a key-pad including a power key on the main body, and an automatic sub-body switch for automatic sub-body opening/closing in a position where a user can key-input even if the sub-body is closed onto the main body, said power control apparatus comprising:

a first switch;

a second switch; and a control unit for controlling said first and second switches according to a powered-on/off state of the terminal;

wherein one end of each of said first switch and said second switch is connected in common at a first node connected to the automatic sub-body switch and the other end of said first switch is connected to a first input end of said control unit, and the other end of said second switch and the power key are connected in common at a second node connected to a second input end of said control unit.

4. A power control apparatus in a portable radio terminal according to claim 3, wherein said control unit controls said first switch open and said second switch closed in the powered-off state of the terminal; and controls said first switch closed and said second switch open in the powered-on state of the terminal.

* * * * *